United States Patent [19]

Coates et al.

[11] Patent Number: 4,521,686

[45] Date of Patent: Jun. 4, 1985

[54] LINEWIDTH MEASURING WITH LINEARITY CALIBRATION OF THE T.V. CAMERA TUBE

[75] Inventors: Vincent J. Coates, Palo Alto; J. Evan Grund, San Jose; Stephen B. Westrate, Portola Valley, all of Calif.

[73] Assignee: Nanometrics Incorporated, Sunnyvale, Calif.

[21] Appl. No.: 497,515

[22] Filed: May 24, 1983

[51] Int. Cl.³ .............................................. H01J 3/14
[52] U.S. Cl. ................................ 250/237 R; 313/384; 313/462
[58] Field of Search ................ 324/404; 313/365, 371, 313/384, 462; 356/308; 250/237 R; 350/319

[56] References Cited

U.S. PATENT DOCUMENTS

| 2,449,093 | 9/1948 | Weingarten | 313/462 |
| 3,547,542 | 12/1970 | Bulpitt et al. | 356/308 |
| 3,683,225 | 8/1972 | Butler | 313/462 |
| 4,283,655 | 8/1981 | Mossman et al. | 313/462 |
| 4,373,817 | 2/1983 | Coates | 250/234 |

*Primary Examiner*—Michael J. Tokar
*Assistant Examiner*—Kevin D. O'Shea
*Attorney, Agent, or Firm*—Linval B. Castle

[57] ABSTRACT

In making precision measurements with a television camera tube, the inherent scan non-linearity and magnification variations are readily calibrated by painting a grid of known dimensions on the tube face.

5 Claims, 2 Drawing Figures

LINEWIDTH MEASURING WITH LINEARITY CALIBRATION OF THE T.V. CAMERA TUBE

BRIEF SUMMARY OF THE INVENTION

This invention relates generally to very narrow linewidth measurements using a television camera tube, and in particular to means for calibrating a vidicon camera tube to eliminate the non-linearity and magnification variation errors that are inherent in such tubes.

In many areas, such as in the measurement of microcircuits, photomasks, and in-process wafers in the electronic industry it is important to measure the width of lines or conductors with very high accuracy and reproducibility. The most practical and economical method of making such measurements is by the use of an optical microscope in which the illuminated object is magnified by the optical system and is projected to produce an image having a width that is perhaps 500 times of that of the original object.

In one early prior art system, the magnified image of a specimen was projected against a narrow slit that was optically adjusted by the operator to be parallel with the illuminated line to be measured. Located behind the slit was a photomultiplier tube and both the tube and slit were moved across the line image by a manually rotated lead screw connected to a micrometer spindle and barrel for the precise lateral measurement of slit movement. The operator then closely monitored a meter indicating the output of the photomultiplier tube and manually rotated the lead screw so that the slit traversed between edges of the projected image. The amount of slit travel, measured by the lead screw micrometer between photomultiplier tube output signals representing the leading and lagging edges of the line image, divided by the known magnification of the projection microscope theoretically yielded an accurate measurement of the actual line width. Unfortunately the system relied heavily on the operator's judgement, visual acuity and attentiveness with the result that the manually operated system generally proved to be inadequate. A great improvement over this manually operated measuring system is described and claimed in U.S. Pat. No. 4,373,817 issued on Feb. 15, 1983. Here, a lead screw driven slit is swept in steps past the projected magnified image and, at each predetermined step, the detected amplitude is stored in memory where it is compared with a similar sweep made without a specimen in position but which records all background and optical irregularities. Thus, a ratio of the two readings produced highly accurate and consistent results.

Many attempts have been made to develop measuring devices using vidicon or other types of television camera equipment. While some degree of success has been realized in developing such apparatus for measuring relatively large areas or widths, television equipment has heretofore been unacceptable for use in very fine linewidth measurements because the scan tends to be insufficiently linear and also because the magnification is not sufficiently stable. Both linearity and magnification stability are critical for very narrow linewidth measurements.

Briefly described, the invention provides means for determining or calibrating the magnification and linearity of a vidicon camera tube by using it to measure a grid of known dimensions. The grid is preferably a series of steps of known width that are painted in opaque or gray between similarly painted vertical fences of known spacing on the face of the tube. Thus, when a magnified image of a very narrow line is projected on to the vidicon target the raster output signal will be modulated by both the fences and steps and results in extremely accurate linewidth measurements without the effects of linearity or magnification changes or calibration drifts.

BRIEF DESCRIPTION OF THE DRAWINGS

In the drawings which illustrate the preferred embodiment of the invention.

DETAILED DESCRIPTION OF THE PREFERRED EMBODIMENT

Figures 1, 2:
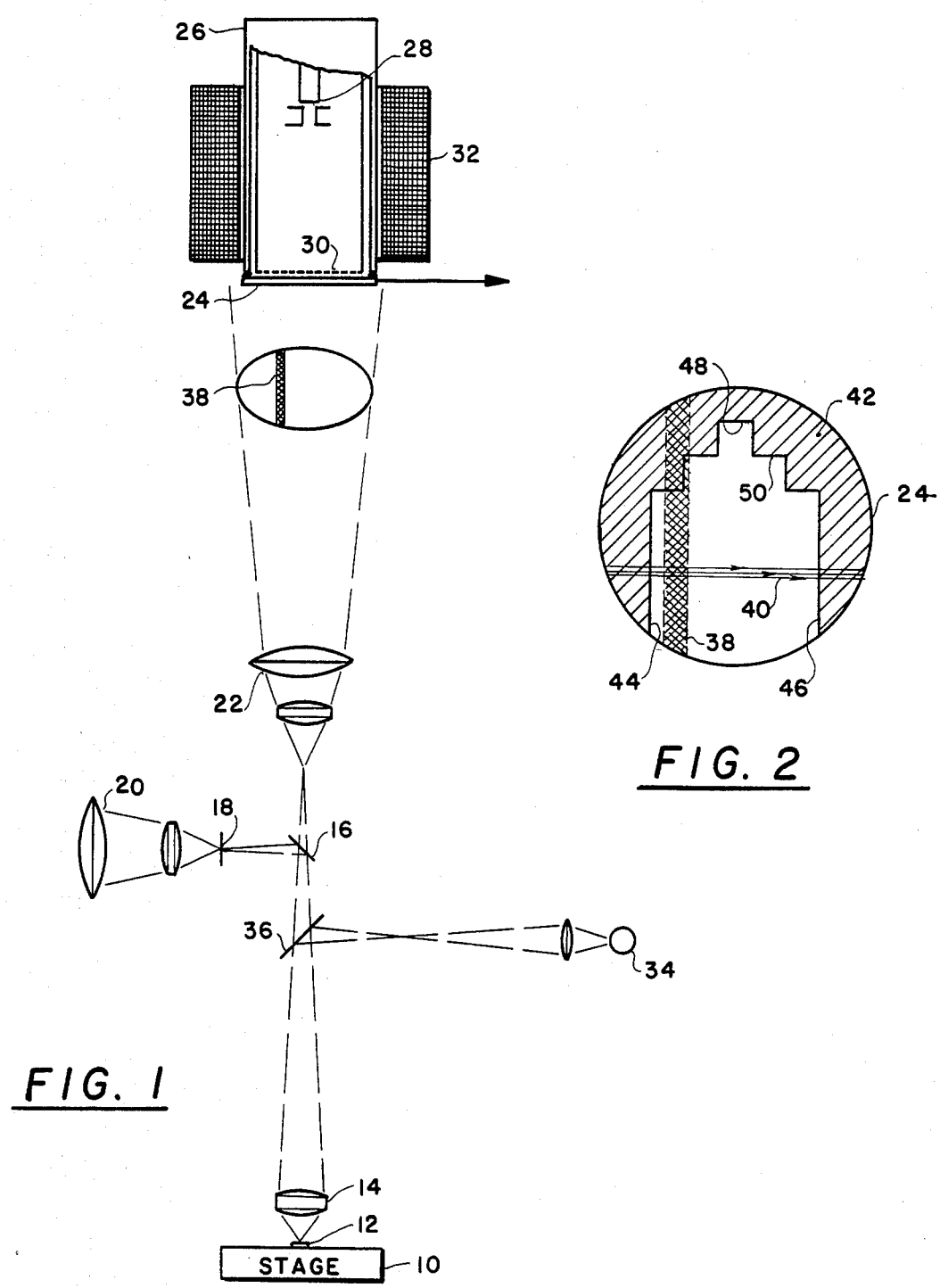
FIG. 1 is a schematic diagram illustrating a vidicon with its faceplate located at the focal plane of a compound projection microscope.
FIG. 2 is an illustration of a typical calibration pattern painted on the faceplate of the vidicon tube.

FIG. 1 is a schematic diagram illustrating a typical vidicon television camera tube adapted for very fine linewidth measurements in connection with a compound projection of microscope. Mounted on an adjustable microscope stage 10 is an object 12 which may be, for example, a typical microcircuit having very narrow conductors which are to be measured by the system illustrated in FIG. 1. The microscope includes an objective lens 14 which projects the image of the object 12 to a beam splitter 16 and through cross hairs 18 to the operator's focusing lens and eyepiece 20. The optical beam also passes through the beam splitter 16 to a similar focusing system 22 which focuses the image of the object 12 upon the plane surface of the glass faceplate 24 of the vidicon television tube 26. The vidicon tube 26 is typical having an electron gun 28 which passes a beam of electrons through a decelerating and collimating mesh 30 to the deposited electrode and photoconductive target layer but, as will be subsequently described, is provided with an external mask or grid that provides a built-in standard that may be used to correct every measurement for errors resulting from the inherent scan non-linearity and magnification variations of television camera tubes.

Typically, the vidicon tube 26 includes surrounding coils 32 for focusing and for providing the necessary X and Y deflection for conventional raster scanning.

The object 12 is illuminated by an illumination lamp 34, the light from which is projected through a beam splitter 36 and through the objective lens 14 to the object 12 and thence via a return path through the focusing lens 22 to the faceplate 24 of the vidicon tube 26. A narrow conductor on the surface of the object 12 may, when magnified several hundred times by the optical system, appear on the faceplate 24 as the image 38 illustrated in the elliptical pattern below the faceplate 24 FIG. 1.

As previously mentioned the measurements of very narrow linewidths with the use of television camera equipment has been unsuccessful because of the inherent problems of magnification changes and because the scan tends to be non-linear. These inherent defects can now be overcome by painting the faceplate of the television camera tube with a calibrated grid to provide a built-in standard that may be used to correct every measurement made with the tube. While a conventional quadrille type of grid may be employed, a preferred grid is illustrated in FIG. 2.

Illustrated in FIG. 2 is the faceplate 24 of the vidicon of 26 FIG. 1. Typically, a vidicon faceplate is circular and may have a diameter in the order of 0.7 inches. The deflection coils associated with the vidicon produce a raster scan pattern 40 which is illustrated in FIG. 2 as being horizontal. It is to be understood that only one or two lines of the scan pattern 40 are illustrated and that the entire faceplate is actually scanned in a conventional manner. The line image 38 projected from the object 12 is vertically aligned perpendicular to the scan pattern 40, as illustrated. The preferred embodiment of the masking grid 42 is illustrated as the crosshatched area and includes the side portions between the arcuate edge of the tube 24 and the vertical fences 44 and 46 which are parallel with each other, perpendicular to the horizontal direction to the scan pattern 40, and spaced by a predetermined known distance, typically approximately one-half inch.

In addition to the areas set out by the vertical fences 44 and 46, additional grids in the form of steps 48 of known and preferably equal widths bridge the distance between the fences 44 and 46. As illustrated in FIG. 2, the space between fences 44 and 46, which may be 0.5 inches, is divided into stepped sections which provide five equal horizontal divisions of known dimensions. Thus, as the scan pattern 40 traverses the topmost or narrowest step 48, its linearity and magnification may readily be measured and made to conform to the known width of that segment 48. Similar adjustments and corrections may be made as the raster scan pattern 40 produces output signals corresponding to the three segments 50. Actual linewidth measurements may then be made between the vertical fences 44 and 46. The appearance of an image 38 of a fine line can therefore be accurately determined without damaging effects of scan non-linearity and magnification variations.

The mask 42 may if desired be of an opaque material so that the vidicon output signal will only be generated as the scan pattern 40 traverses the unmasked area of the faceplate 24. It may be more desirable, however, to mask the faceplate with a semi-opaque or semi-transparent masking material which will modulate the raster scan output so that the edges of the fences 44 and 46 and of the step areas may be readily determined from the output signals.

We claim:

1. In a process employing a television camera tube for the accurate measurement of images projected onto the faceplate of the tube, a method for calibrating the tube output to eliminate the effects of inherent scan non-linearity and magnification variations, said method including the step of:

painting a rectangular grid on the faceplate of the camera tube, said grid including first and second straight parallel fences of known spacing and perpendicular to the direction of the raster scan of said tube, said grid masking the areas between said fences and the arcuate edges of said tube adjacent said fences.

2. The method claimed in claim 1 whereby said rectangular grid further includes a plurality of rectangular steps of known dimensions bridging at least one edge of said tube surface between said first and second fences.

3. The method claimed in claim 2 wherein said grid is applied to the faceplate of said tube with an opaque masking material.

4. The method claimed in claim 2 wherein said grid is applied to the faceplate of said tube with a semi-transparent masking material.

5. The method claimed in claim 2 wherein said camera tube is a vidicon tube the faceplate of which is on the focal plane of an optical projection system.

* * * * *